United States Patent [19]

Zimmermann

[11] Patent Number: 5,457,188
[45] Date of Patent: Oct. 10, 1995

[54] 4-AZO-1-PHENYL-PYRAZOLONE DERIVATIVE-CONTAINING LAKES AS PIGMENTS

[75] Inventor: Gesine Zimmermann, Wermelskirchen, Germany

[73] Assignee: Bayer Aktiengesellschaft, Leverkusen, Germany

[21] Appl. No.: 279,309

[22] Filed: Jul. 22, 1994

Related U.S. Application Data

[63] Continuation of Ser. No. 78,798, Jun. 16, 1993, abandoned, which is a continuation of Ser. No. 610,715, Nov. 6, 1990, abandoned, which is a continuation of Ser. No. 449,483, Dec. 11, 1989, abandoned, which is a continuation of Ser. No. 303,015, Jan. 30, 1989, abandoned, which is a continuation of Ser. No. 99,826, Sep. 23, 1987, abandoned, which is a continuation of Ser. No. 934,762, Nov. 25, 1986, abandoned.

[30] Foreign Application Priority Data

Dec. 10, 1985 [DE] Germany ............ 35 43 512.7

[51] Int. Cl.⁶ .................. C09B 63/00; C09B 29/48; D06P 1/39; D06P 1/44
[52] U.S. Cl. .................. 534/780; 534/573; 534/781; 534/784; 106/402; 106/496
[58] Field of Search ..................... 534/780, 781; 106/402, 496

[56] References Cited

U.S. PATENT DOCUMENTS

| | | | |
|---|---|---|---|
| 1,730,179 | 10/1929 | Wagner | 534/781 X |
| 1,809,030 | 6/1931 | Geller | 534/781 X |
| 1,962,226 | 6/1934 | Woodward | 534/781 |
| 2,808,400 | 10/1957 | Struve et al. | 534/573 X |
| 3,770,638 | 11/1973 | Chechak | 430/112 |
| 3,802,836 | 4/1974 | Speck | 534/780 X |
| 3,803,122 | 4/1974 | Kilmurry | 534/781 X |
| 4,045,425 | 8/1977 | Hunter | 534/781 X |
| 4,594,411 | 6/1986 | Henning | 534/784 |

FOREIGN PATENT DOCUMENTS

| | | | |
|---|---|---|---|
| 0126405 | 11/1984 | European Pat. Off. | 534/784 |
| 2064913 | 7/1971 | France | 534/784 X |
| 2500019 | 7/1976 | Germany | 534/781 |
| 2621529 | 11/1976 | Germany | 534/780 |
| 2616981 | 10/1977 | Germany | 534/784 |
| 3133404 | 3/1983 | Germany | 534/784 |
| 53-37732 | 4/1978 | Japan | 534/712 |
| 308096 | 2/1930 | United Kingdom | 534/780 |
| 858562 | 1/1961 | United Kingdom | 534/781 |
| 874220 | 8/1961 | United Kingdom | 534/780 |
| 966677 | 8/1964 | United Kingdom | 534/781 |
| 1330907 | 9/1973 | United Kingdom | 534/780 |
| 1488599 | 10/1977 | United Kingdom | 534/781 |
| 2106124 | 5/1982 | United Kingdom | . |

*Primary Examiner*—Floyd D. Higel
*Attorney, Agent, or Firm*—Sprung Horn Kramer & Woods

[57] ABSTRACT

An azo lake of the formula

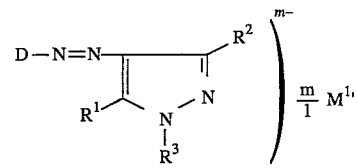

in which

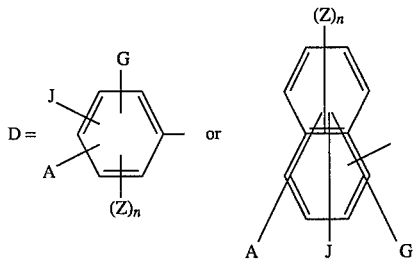

$R^1$ = —OH or —$NR^4R^5$,
$R^2$ =

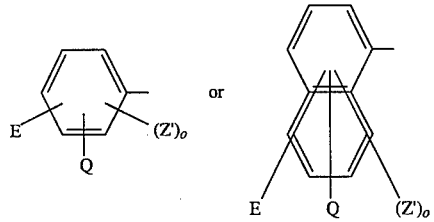

except the lake of the formula

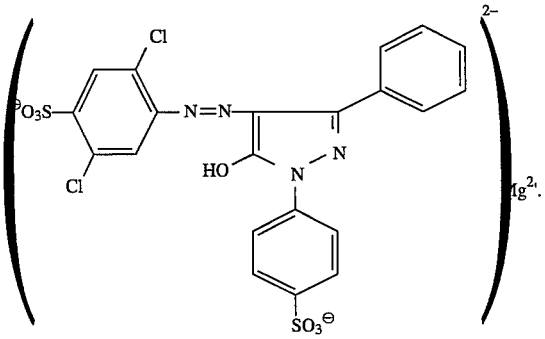

Such azo lakes are useful as pigments.

7 Claims, No Drawings

4-AZO-1-PHENYL-PYRAZOLONE DERIVATIVE-CONTAINING LAKES AS PIGMENTS

This is a Request for filing a continuation-in-part, application under 37 CFR 1.62 of prior application Ser. No. 08/078,798, filed on Jun. 16, 1993, now abandoned, which is a continuation of Ser. No. 07/610,715, filed on Nov. 6, 1990, now abandoned, which is a continuation of Ser. No. 07/449,483, filed on Dec. 11, 1989, now abandoned, which is a continuation of Ser. No. 07/303,015, filed on Jan. 30, 1989, now abandoned, which is a continuation of Ser. No. 07/099,826, filed on Sep. 23, 1987, now abandoned, which is a continuation of Ser. No. 06/934,762, filed on Nov. 25, 1986, now abandoned.

The invention relates to azo lakes of the formula

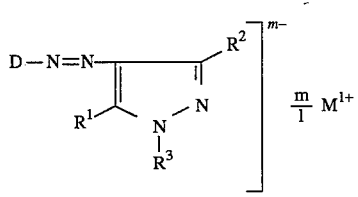

in which

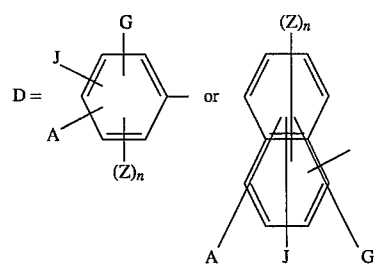

$R^1 =$ —OH or —$NR^4R^5$,
$R^2 =$

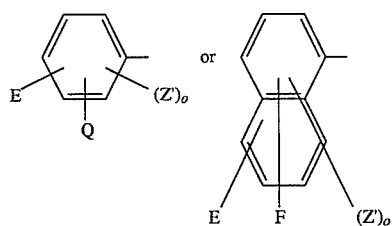

and when $R^1 =$ —$NR^4R^5$ additionally H or carboxylate, alkyl, in particular methyl,
$R^3 =$

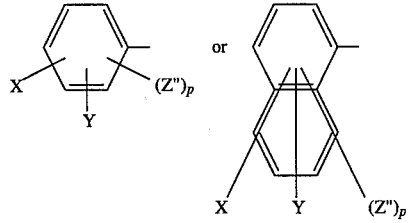

$R^4$, $R^5 =$ H, alkyl, cycloalkyl, aralkyl, aryl, each of which hydrocarbon radical can be substituted, Z, Z', Z''=carboxylate, sulphonate, A, J, G, E, Q, X,=H, —$CF_3$, halogen, —$NO_2$, —CN, $R^6$, —$OR^6$, —$NR^6R^7$, —$NH_2$, —$SO_2NH_2$, —$SO_2$—

$NR^6R^7$, —$CONH_2$, —$CONR^6R^7$, —$NHCOR^6$,

M=ammonium or metal, n, o, p=0, 1, 2, m=n+o+p and when $R^2=$—COOH, n+o+p+1, with the condition $1 \leq m \leq 3$, L=valency of M.

$R^6$, $R^7$=alkyl, cycloalkyl aralkyl, aryl, each of which hydrocarbon radical can be substituted, except the lake of the formula

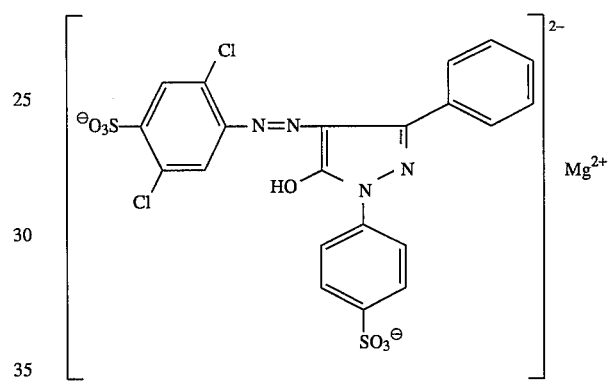

m stands preferably for 2, i.e. the anionic part underlying the lake has two carboxylate and/or sulphonate groups which are particularly preferably situated in D and $R^3$.

Alkyl ($R^2$, $R^4$, $R^5$, $R^6$, $R^7$) preferably signifies $C_1-C_4$-alkyl, in particular methyl and ethyl.

Cycloalkyl ($R^4$, $R^5$, $R^6$, $R^7$) preferably signifies $C_3-C_7$-cycloalkyl, in particular cyclopentyl and cyclohexyl.

Aralkyl ($R^4$, $R^5$, $R^6$, $R^7$) preferably signifies phenyl-$C_1-C_4$-alkyl, in particular benzyl and phenethyl.

Aryl ($R^4$, $R^5$, $R^6$, $R^7$) preferably signifies phenyl and naphthyl.

Halogen (A, J, G, E, Q, X, Y) preferably signifies chlorine, bromine and fluorine.

D preferably stands for

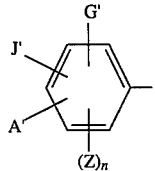

(In this and the following formulae, recurring symbols have the meanings and preferred meanings already indicated in the formula I).

A', J', G'=H, Cl, Br, —$CH_3$, —$C_2H_5$, —$OCH_3$, —$OC_2H_5$, —$NO_2$, —$NHCOCH_3$.

Further preferred meanings for D are:

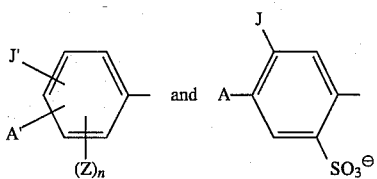

Individual examples of radicals D are:

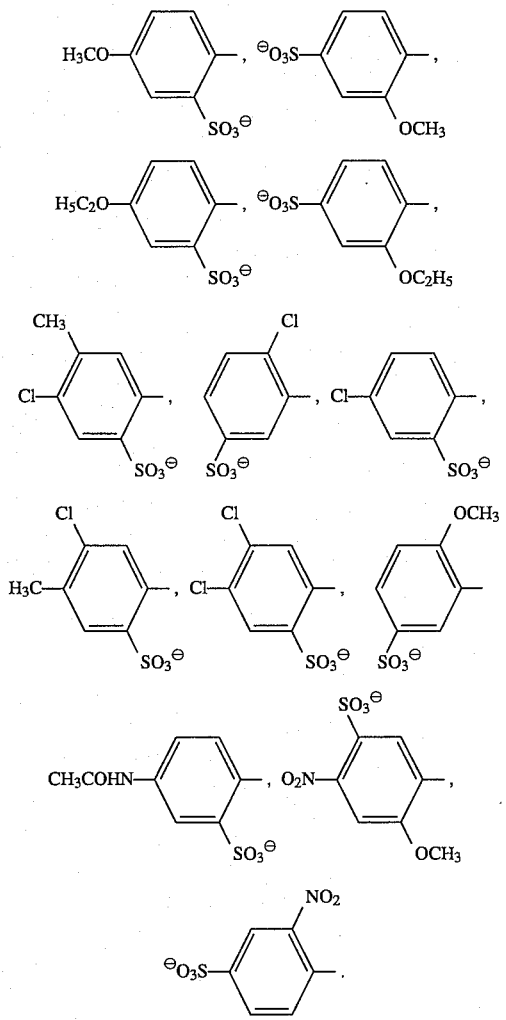

$R^1$ preferably stands for —OH or —NH$_2$.
$R^2$ has the following preferred meanings:

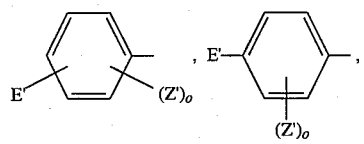

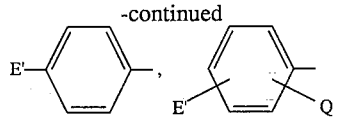

and —CH$_3$ when $R^1$=—NR$^4$R$^5$.
E'=H, Cl, Br, —CH$_3$, —C$_2$H$_5$, —OCH$_3$, —OC$_2$H$_5$, —NHCOCH$_3$, —NO$_2$.
$R^3$ has the following preferred meaning:

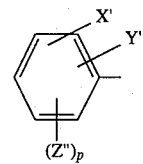

X'=H, —Cl, —Br, —CH$_3$, —C$_2$H$_5$;
Y'=H, —Cl, —Br, —OCH$_3$, —OC$_2$H$_5$,

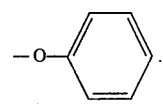

p is preferably 1 and Z" preferably stands in the 2'- or 3'-position of the phenyl ring.
Individual examples of radicals $R^3$ are:

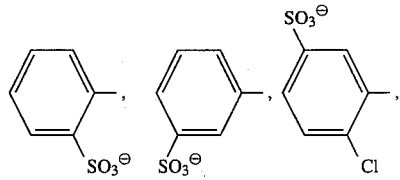

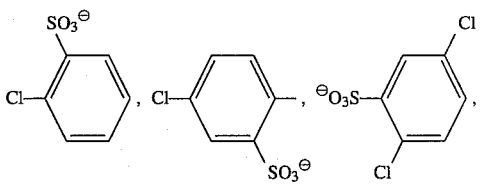

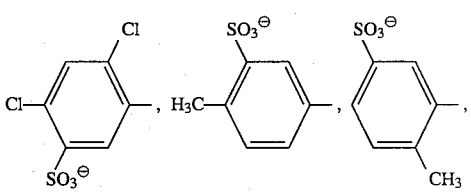

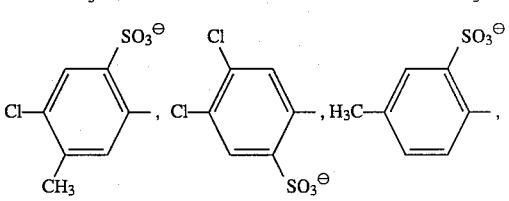

-continued

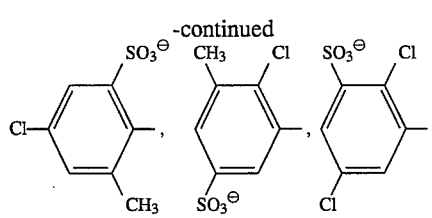

By combining the afforementioned preferred radicals, particularly preferred dyestuffs are formed. The table below shows some of these combinations:

TABLE

| D | R¹ | R² | R³ |
|---|---|---|---|
| ![J'-A'-(Z)n with G'] | —OH | ![E'-(Z)o] | ![X'-Y'-(Z")p] |
| " | —NH₂ | " | " |
| " | —OH | ![E'-Q] | " |
| " | —NH₂ | " | " |
| " | —NH₂ | —CH₃ | " |
| ![J'-A-(Z)n] | —OH | ![E'-(Z)o] | " |
| " | —NH₂ | " | " |
| " | —NH₂ | —CH₃ | " |
| ![J-A-SO₃⁻] | —OH | ![E'-] | " |
| " | —NH₂ | —CH₃ | " |
| " | —NH₂ | ![E'-] | " |

M preferably signifies an alkali metal (Na, K) or alkaline earth metal (Ba, Sr), manganese or ammonium. Particularly preferably M signifies calcium.

Mixtures of azo lakes of the formula I having different Ms, for example Ca and Sr, likewise have good properties. The azo lakes according to the invention can occur in different crystal modifications.

It has to be mentioned that the lakes according to the invention can in general contain greater or lesser amounts of ammonium or alkali metal ions from the synthesis, for example Na, K, Li.

The compounds of the formula I are prepared by methods described in the literature.

For instance, the iminopyrazolones of the formula I are obtained by reacting the corresponding hydrazines with dimeric acetonitrile or the corresponding β-keto-nitriles. The 3-arylpyrazolones can be obtained, inter alia, by condensing the corresponding benzoyl acetates or benzoyl aceramides with hydrazines. The reactions can take place not only in the strongly and weakly acid but also in the neutral and alkaline region.

To prepare the azo lakes of the formula I, amines of the formula

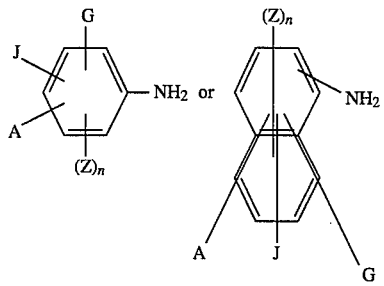

can be diazotized and coupled onto compounds of the formula

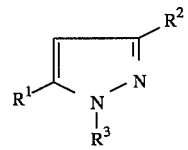

and the dyestuffs be converted into the desired metal salts, The reactions can be carried out in the presence of nonionic, anionic or cationic dispersants and/or with the addition of or in organic solvents.

To obtain certain primary properties, it is expedient to heat the coupling mixture for some time, if desired to the boil or under pressure to above 100° C.

Particularly readily processable products are obtained on subjecting the lakes, after coupling, as moist presscakes or as dried powders, to an aftertreatment with organic solvents such as pyridine, dimethylformamide, alcohols such as ethanol, methanol, isopropanol, butanol, toluene, xylene, glycol, glycol monomethyl ethers, glacial acetic acid, chlorobenzene, dichlorobenzene, nitrobenzene or mixtures thereof, if desired with water, at refluxing temperature or under pressure at elevated temperature or on milling the lakes, after coupling, in the presence of milling auxiliaries. Good results can also be obtained by aftertreating the products, suspended in water, the abovementioned organic solvents or mixtures of these with themselves or water, with ultrasound at room or elevated temperature.

The isolated lakes can be subjected to a thermal aftertreatment, for example to a drying at elevated temperature, preferably at 40° C. to 150° C., including spraydrying.

Compounds of the formula I are useful pigments. Particularly useful pigments are the alkaline earth metal or manganese lakes. These can also be prepared from the generally more readily soluble ammonium or alkali metal lakes. The pigments according to the invention are suitable in particular for colouring plastics. They give greenish yellow to reddish orange and brown colorations. Particularly noteworthy are polyolefines such as polyethylene and polypropylene and also polystyrene with butadiene, modified polystyrene, polycarbonate, polyvinyl chloride, ABS and polymer blends such as polycarbonate/ABS, polyphenylene oxide/styrene-butadiene, ethylenepropylenecopolymer/propylene and polycarbonate/polybutylene terephthalate.

The lakes have an excellent thermostability, solvent, water, plasticizer and migration fastness, high tinctorial strength and also very good light and weathering resistance. The pigments are also suitable for colouring paints, rubber, natural and synthetic resins, filament viscose rayon and cellulose ethers or esters, polyamides, polyurethanes, polyglycol terephthalates and polyacrylonitrile in the spinning bulk.

EXAMPLE 1

6.4 g of 1-amino-4-chloro-5-methylbenzene-2-sulphonic acid are dissolved in 55 ml of water with 5 ml of sodium hydroxide solution and are precipitated with 9.7 ml of concentrated hydrochloric acid. This is followed by cooling with ice down to 0°–5° C. and diazotizing by adding 6.8 ml of a 30% strength sodium nitrite solution.

The diazotization is added to a solution of 9.5 g of 1-(3'-sulphophenyl)-3-phenyl-5-pyrazolone in 55.4 ml of 25% strength sodium acetate solution. After the coupling has ended, the temperature is raised to 80° C. and 24 g of calcium chloride are added. An hour at 80° C. is followed by filtration with suction, washing, and drying at 80° C.

This gives 16 g of a strongly reddish yellow lake of the formula

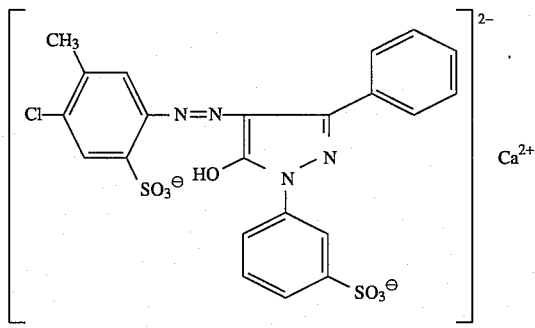

EXAMPLE 2

7 g of 1-amino-3,4-dichlorobenzene-6-sulphonic acid are diazotized as described in Example 1. After the reaction has ended, 44 ml of water and 7.6 g of 1-(3'-suphophenyl)-3-methyl-5-iminopyrazolone are added to the reaction mixture, which is brought to pH 6–6.5 with 25% strength ammonia solution and stirred until the coupling has ended.

This is followed by heating to 80° C., addition of 24 g of calcium chloride and subsequent stirring at 80° C. for one hour.

Removal of the resulting pigment by filtration with suction, washing with water and spray-drying gives 15 g of a greenish yellow lake of the formula

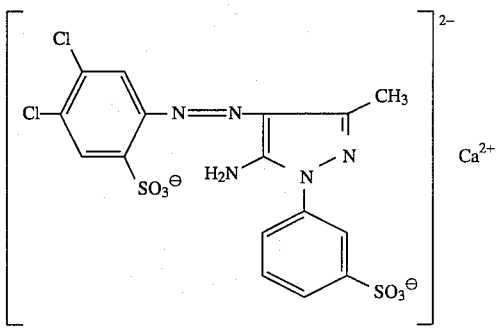

EXAMPLE 3

Following a procedure as described in Example 1, the aqueous presscake is dewatered in butanol, filtered off with suction, washed and dried at 50° C. This gives 15 g of a yellow lake.

EXAMPLE 4

The method of Example 3 is used to dewater the aqueous presscake in butanol, and the suspension obtained is treated with ultrasound, filtered off with suction, washed and dried at 50° C. This gives 13.2 g of a greenish yellow lake having improved dispersibility.

The methods of Examples 1–4 were used to prepare Examples 5–161 mentioned below.

| Example | Diazo component | Coupling component | Me | Shade |
|---|---|---|---|---|
| 5 | 1-amino-3,4-dichloro-benzene-6-sulphonic acid | 1-(2'-sulphophenyl)-3-methyl-5-iminopyrazolone | $Ca^{2+}$ | Yellow |
| 6 | 1-amino-3,4-dichloro-benzene-6-sulphonic acid | 1-(2'-chloro-5'-sulphophenyl)-3-methyl-5-iminopyrazolone | $Ca^{2+}$ | Yellow |
| 7 | 1-amino-3,4-dichloro-benzene-6-sulphonic acid | 1-(2',5'-dichloro-4'-sulpho-phenyl)-3-methyl-5-iminopyrazolone | $Ca^{2+}$ | Yellow |
| 8 | 1-amino-3,4-dichloro-benzene-6-sulphonic acid | 1-(4'-chloro-3'-sulphophenyl)-3-methyl-5-iminopyrazolone | $Ca^{2+}$ | Yellow |
| 9 | 1-amino-3,4-dichloro-benzene-6-sulphonic acid | 1-(2',4'-dichloro-5'-sulpho-phenyl)-3-methyl-5-iminopyrazolone | $Ca^{2+}$ | Yellow |
| 10 | 1-amino-3,4-dichloro-benzene-6-sulphonic acid | 1-(4'-methyl-3'-sulphophenyl)-3-methyl-5-iminopyrazolone | $Ca^{2+}$ | Yellow |
| 11 | 1-amino-3,4-dichloro-benzene-6-sulphonic acid | 1-(6'-methyl-3'-sulphophenyl)-3-methyl-5-iminopyrazolone | $Ca^{2+}$ | Yellow |
| 12 | 1-amino-3,4-dichloro-benzene-6-sulphonic acid | 1-(4'-chloro-5'-methyl-2'-sulpho-phenyl)-3-methyl-5-iminopyrazolone | $Ca^{2+}$ | Yellow |
| 13 | 1-amino-3,4-dichloro-benzene-6-sulphonic acid | 1-(3'-sulphophenyl)-3-phenyl-5-iminopyrazolone | $Ca^{2+}$ | Yellow |

-continued

| Example | Diazo component | Coupling component | Me | Shade |
|---|---|---|---|---|
| 14 | 1-amino-3,4-dichloro-benzene-6-sulphonic acid | 1-(2'-sulphophenyl)-3-phenyl-5-iminopyrazolone | $Ca^{2+}$ | Reddish yellow |
| 15 | 1-amino-3,4-dichloro-benzene-6-sulphonic acid | 1-(2'chloro-5'-sulphophenyl)-3-phenyl-5-iminopyrazolone | $Ca^{2+}$ | Yellow |
| 16 | 1-amino-3,4-dichloro-benzene-6-sulphonic acid | 1-(4'-chloro-3'-sulphophenyl)-3-phenyl-5-iminopyrazolone | $Ca^{2+}$ | Yellow |
| 17 | 1-amino-3,4-dichloro-benzene-6-sulphonic acid | 1-(3',4'-dichloro-6'-sulpho-phenyl)-3-phenyl-5-iminopyrazolone | $Ca^{2+}$ | Yellow |
| 18 | 1-amino-3,4-dichloro-benzene-6-sulphonic acid | 1-(4'-methyl-3'-sulphophenyl)-3-phenyl-5-iminopyrazolone | $Ca^{2+}$ | Yellow |
| 19 | 1-amino-3,4-dichloro-benzene-6-sulphonic acid | 1-(4'-methyl-2'-sulphophenyl)-3-phenyl-5-iminopyrazolone | $Ca^{2+}$ | Yellow |
| 20 | 1-amino-3,4-dichloro-benzene-6-sulphonic acid | 1-(4'-chloro-6'-methyl-2'-sulpho-phenyl)-3-phenyl-5-iminopyrazolone | $Ca^{2+}$ | Yellow |
| 21 | 1-amino-3,4-dichloro-benzene-6-sulphonic acid | 1-(2'-sulphophenyl)-3-phenyl-pyrazol-5-one | $Ca^{2+}$ | Yellow |
| 22 | 1-amino-3,4-dichloro-benzene-6-sulphonic acid | 1-(3'-sulphophenyl)-3-phenyl-pyrazol-5-one | $Ca^{2+}$ | Yellowish orange |
| 23 | 1-amino-3,4-dichloro-benzene-6-sulphonic acid | 1-(2'-chloro-5'-sulphophenyl-3-phenyl-pyrazol-5-one | $Ca^{2+}$ | Yellow |
| 24 | 1-amino-3,4-dichloro-benzene-6-sulphonic acid | 1-(4'-chloro-3'-sulphophenyl)-3-phenyl-pyrazol-5-one | $Ca^{2+}$ | Reddish yellow |
| 25 | 1-amino-3,4-dichloro-benzene-6-sulphonic acid | 1-(4'-chloro-2'-sulphophenyl)-3-phenyl-pyrazol-5-one | $Ca^{2+}$ | Reddish yellow |
| 26 | 1-amino-3,4-dichloro-benzene-6-sulphonic acid | 1-(2',4'-dichloro-5'-sulphophenyl)-3-phenyl-pyrazol-5-one | $Ca^{2+}$ | Yellow |
| 27 | 1-amino-3,4-dichloro-benzene-6-sulphonic acid | 1-(4'-methyl-3'-sulphophenyl)-3-phenyl-pyrazol-5-one | $Ca^{2+}$ | Reddish yellow |
| 28 | 1-amino-3,4-dichloro-benzene-6-sulphonic acid | 1-(6'-methyl-3'-sulphophenyl)-3-phenyl-pyrazol-5-one | $Ca^{2+}$ | Reddish yellow |
| 29 | 1-amino-3,4-dichloro-benzene-6-sulphonic acid | 1-(4'-chloro-5'-methyl-2'-sulpho-phenyl)-3-phenyl-pyrazol-5-one | $Ca^{2+}$ | Reddish yellow |
| 30 | 1-amino-3,4-dichloro-benzene-6-sulphonic acid | 1-(3'-sulphophenyl)-3-(4'-chloro-phenyl)-pyrazol-5-one | $Ca^{2+}$ | Orange |
| 31 | 1-amino-3,4-dichloro-benzene-6-sulphonic acid | 1-(4'-chloro-3'-sulphophenyl)-3-(4'-chlorophenyl)-pyrazol-5-one | $Ca^{2+}$ | Reddish yellow |
| 32 | 1-amino-3,4-dichloro-benzene-6-sulphonic acid | 1-(2',5'-dichloro-4'-sulphophenyl)-3-(4'-chlorophenyl)-pyrazol-5-one | $Ca^{2+}$ | Yellow |
| 33 | 1-amino-3,4-dichloro-benzene-6-sulphonic acid | 1-(4'-methyl-3'-sulphophenyl)-3-(4'-chlorophenyl)-pyrazol-5-one | $Ca^{2+}$ | Reddish yellow |
| 34 | 1-amino-3,4-dichloro-benzene-6-sulphonic acid | 1-(4'-chloro-5'-methyl-2'-sulpho-phenyl)-3-(4'-chlorophenyl)-pyrizol-5-one | $Ca^{2+}$ | Reddish yellow |
| 35 | 1-amino-3,4-dichloro-benzene-6-sulphonic acid | 1-(3'-sulphophenyl)-3-(4'-methoxy-phenyl)-pyrazol-5-one | $Ca^{2+}$ | Brownish yellow |
| 36 | 1-amino-3,4-dichloro-benzene-6-sulphonic acid | 1-(4'-chloro-3'-sulphophenyl)-3-(4'-methoxyphenyl)-pyrazol-5-one | $Ca^{2+}$ | Brownish yellow |
| 37 | 1-amino-3,4-dichloro-benzene-6-sulphonic acid | 1-(2',5'-dichloro-4'-sulphophenyl)-3-(4'-methoxyphenyl)-pyrazol-5-one | $Ca^{2+}$ | Red-brownish yellow |
| 38 | 1-amino-3,4-dichloro-benzene-6-sulphonic acid | 1-(4'-chloro-5'-methyl-2'-sulpho-phenyl)-3-(4'-methoxyphenyl)-pyrazol-5-one | $Ca^{2+}$ | Red-brownish yellow |
| 39 | 1-amino-3,4-dichloro-benzene-6-sulphonic acid | 1-(3'-sulphophenyl)-3-(4'-nitro-phenyl)-pyrazol-5-one | $Ca^{2+}$ | Orange |

-continued

| Example | Diazo component | Coupling component | Me | Shade |
|---|---|---|---|---|
| | acid | | | |
| 40 | 1-amino-4-chloro-5-methyl-benzene-2-sulphonic acid | 1-(3'-sulphophenyl)-3-methyl-5-iminopyrazolone | $Ca^{2+}$ | Greenish yellow |
| 41 | 1-amino-4-chloro-5-methyl-benzene-2-sulphonic acid | 1-(2'-sulphophenyl)-3-methyl-5-iminopyrazolone | $Ca^{2+}$ | Yellow |
| 42 | 1-amino-4-chloro-5-methyl-benzene-2-sulphonic acid | 1-(2'-chloro-5'-sulphophenyl)--3-methyl-5-iminopyrazolone | $Ca^{2+}$ | Yellow |
| 43 | 1-amino-4-chloro-5-methyl-benzene-2-sulphonic acid | 1-(2',5'-dichloro-4'-sulphophenyl)--3-methyl-5-iminopyrazolone | $Ca^{2+}$ | Greenish yellow |
| 44 | 1-amino-4-chloro-5-methyl-benzene-2-sulphonic acid | 1-(4'-chloro-3'-sulphophenyl)-3-methyl-5-iminopyrazolone | $Ca^{2+}$ | Greenish yellow |
| 45 | 1-amino-4-chloro-5-methyl benzene-2-sulphonic acid | 1-(2',4'-dichloro-5'-sulphophenyl)-3-methyl-5-iminopyrazolone | $Ca^{2+}$ | Greenish yellow |
| 46 | 1-amino-4-chloro-5-methyl benzene-2-sulphonic acid | 1-(4'-methyl-3'-sulphophenyl)-3-methyl-5-iminopyrazolone | $Ca^{2+}$ | Greenish yellow |
| 47 | 1-amino-4-chloro-5-methyl benzene-2-sulphonic acid | 1-(6'-methyl-3'-sulphophenyl)-3-methyl-5-iminopyrazolone | $Ca^{2+}$ | Yellow |
| 48 | 1-amino-4-chloro-5-methyl benzene-2-sulphonic acid | 1-(4'-chloro-5'-methyl-2-sulphophenyl)-3-methyl-5-iminopyrazolone | $Ca^{2+}$ | Yellow |
| 49 | 1-amino-4-chloro-5-methyl benzene-2-sulphonic acid | 1-(3'-sulphophenyl)-3-phenyl-5-iminopyrazolone | $Ca^{2+}$ | Yellow |
| 50 | 1-amino-4-chloro-5-methyl benzene-2-sulphonic acid | 1-(2'-sulphophenyl)-3-phenyl-5-iminopyrazolone | $Ca^{2+}$ | Yellow |
| 51 | 1-amino-4-chloro-5-methyl benzene-2-sulphonic acid | 1-(2'-chloro-5'-sulphophenyl)-3-phenyl-5-iminopyrazolone | $Ca^{2+}$ | Yellow |
| 52 | 1-amino-4-chloro-5-methyl benzene-2-sulphonic acid | 1-(4'-chloro-3'-sulphophenyl)-3-phenyl-5-iminopyrazolone | $Ca^{2+}$ | Yellow |
| 53 | 1-amino-4-chloro-5-methyl benzene-2-sulphonic acid | 1-(3',4'-dichloro-6'-sulphophenyl)-3-phenyl-5-iminopyrazolone | $Ca^{2+}$ | Yellow |
| 54 | 1-amino-4-chloro-5-methyl benzene-2-sulphonic acid | 1-(4'-methyl-3'-sulphophenyl)-3-phenyl-5-iminopyrazolone | $Ca^{2+}$ | Reddish yellow |
| 55 | 1-amino-4-chloro-5-methyl benzene-2-sulphonic acid | 1-(4'-methyl-2'-sulphophenyl)-3-phenyl-5-iminopyrazolone | $Ca^{2+}$ | Reddish yellow |
| 56 | 1-amino-4-chloro-5-methylbenzene-2-sulphonic acid | 1-(4'-chloro-6'-methyl-2'-sulphophenyl)-3-phenyl-5-iminopyrazolone | $Ca^{2+}$ | Reddish yellow |
| 57 | 1-amino-4-chloro-5-methylbenzene-2-sulphonic acid | 1-(2'-sulphophenyl-3-phenyl-pyrazol-5-one | $Ca^{2+}$ | Yellowish orange |
| 58 | 1-amino-4-chloro-5-methylbenzene-2-sulphonic acid | 1-(2'-chloro-5'-sulphophenyl)-3-phenyl-pyrazol-5-one | $Ca^{2+}$ | Reddish yellow |
| 59 | 1-amino-4-chloro-5-methylbenzene-2-sulphonic acid | 1-(4'-chloro-3'-sulphophenyl)-3-phenyl-pyrazol-5-one | $Ca^{2+}$ | Reddish yellow |
| 60 | 1-amino-4-chloro-5-methylbenzene-2-sulphonic acid | 1-(4'-chloro-2'-sulphophenyl)-3-phenyl-pyrazol-5-one | $Ca^{2+}$ | Yellow |
| 61 | 1-amino-4-chloro-5-methylbenzene-2-sulphonic acid | 1-(2',4'-dichloro-5'-sulphophenyl)--3-phenyl-pyrazol-5-one | $Ca^{2+}$ | Yellow |
| 62 | 1-amino-4-chloro-5-methylbenzene-2-sulphonic acid | 1-(4'-methyl-3'-sulphophenyl)-3-phenyl-pyrazol-5-one | $Ca^{2+}$ | Reddish yellow |
| 63 | 1-amino-4-chloro-5-methylbenzene-2-sulphonic acid | 1-(6'-methyl-3'-sulphophenyl)-3-phenyl-pyrazol-5-one | $Ca^{2+}$ | Reddish yellow |
| 64 | 1-amino-4-chloro-5-methylbenzene-2-sulphonic acid | 1-(4'-chloro-5'-methyl-2'-sulphophenyl)-3-phenyl-pyrazol-5-one | $Ca^{2+}$ | Reddish yellow |
| 65 | 1-amino-4-chloro-5- | 1-(3'-sulphophenyl)-3-(4'-chloro- | $Ca^{2+}$ | Reddish |

-continued

| Example | Diazo component | Coupling component | Me | Shade |
|---|---|---|---|---|
| | methylbenzene-2-sulphonic acid | phenyl)-pyrazol-5-one | | yellow |
| 66 | 1-amino-4-chloro-5-methylbenzene-2-sulphonic acid | 1-(4'-chloro-3'-sulphophenyl)-3-(4'-chlorophenyl)-pyrazol-5-one | $Ca^{2+}$ | Reddish Yellow |
| 67 | 1-amino-4-chloro-5-methylbenzene-2-sulphonic acid | 1-(2',5'-dichloro-4'-sulphophenyl)-3-(4'-chlorophenyl)-pyrazol-5-one | $Ca^{2+}$ | Yellow |
| 68 | 1-amino-4-chloro-5-methylbenzene-2-sulphonic acid | 1-(4'-methyl-3'-sulphophenyl)-3-(4'-chlorophenyl)-pyrazol-5-one | $Ca^{2+}$ | Reddish yellow |
| 69 | 1-amino-4-chloro-5-methylbenzene-2-sulphonic acid | 1-(4'-chloro-5'-methyl-2'-sulphophenyl)-3-(4-chlorophenyl)-pyrazol-5-one | $Ca^{2+}$ | Reddish yellow |
| 70 | 1-amino-4-chloro-5-methylbenzene-2-sulphonic acid | 1-(3'-sulphophenyl)-3-(4'-methoxyphenyl)-pyrazol-5-one | $Ca^{2+}$ | Reddish yellow |
| 71 | 1-amino-4-chloro-5-methylbenzene-2-sulphonic acid | 1-(4'-chloro-3'-sulphophenyl)-3-(4'-methoxyphenyl)-pyrazol-5-one | $Ca^{2+}$ | Reddish yellow |
| 72 | 1-amino-4-chloro-5-methylbenzene-2-sulphonic acid | 1-(2',5'-dichloro-4'-sulphophenyl)-3-(4'-methoxyphenyl)-pyrazol-5-one | $Ca^{2+}$ | Reddish yellow |
| 73 | 1-amino-4-chloro-5-methylbenzene-2-sulphonic acid | 1-(4'-chloro-5'-methyl-2'-sulphophenyl)-3-(4'-methoxyphenyl)-pyrazol-5-one | $Ca^{2+}$ | Red-brownish yellow |
| 74 | 1-amino-4-chloro-5-methylbenzene-2-sulphonic acid | 1-(3'-sulphophenyl)-3-(4'-nitrophenyl)-pyrazol-5-one | $Ca^{2+}$ | Orange |
| 75 | 1-amino-2-chloro-benzene-5-sulphonic acid | 1-(3'-sulphophenyl)-3-methyl-5-iminopyrazolone | $Ca^{2+}$ | Yellow |
| 76 | 1-amino-2-chloro-benzene-5-sulphonic acid | 1-(4'-chloro-3'-sulphophenyl)-3-methyl-5-iminopyrazolone | $Ca^{2+}$ | Yellow |
| 77 | 1-amino-2-chloro-benzene-5-sulphonic acid | 1-(2'-chloro-5'-sulphophenyl)-3-methyl-5-iminopyrazolone | $Ca^{2+}$ | Yellow |
| 78 | 1-amino-2-chloro-benzene-5-sulphonic acid | 1-(2',5'-dichloro-4'-sulphophenyl)-3-methyl-5-iminopyrazolone | $Ca^{2+}$ | Yellow |
| 79 | 1-amino-2-chloro-benzene-5-sulphonic acid | 1-(3'-sulphophenyl)-3-phenyl-5-iminopyrazolone | $Ca^{2+}$ | Yellow |
| 80 | 1-amino-2-chloro-benzene-5-sulphonic acid | 1-(2'-sulphophenyl)-3-phenyl-pyrazol-5-one | $Ca^{2+}$ | Reddish yellow |
| 81 | 1-amino-2-chloro-benzene-5-sulphonic acid | 1-(3'-sulphophenyl)-3-phenyl-pyrazol-5-one | $Ca^{2+}$ | Reddish yellow |
| 82 | 1-amino-2-chloro-benzene-5-sulphonic acid | 1-(2'-chloro-5-sulphophenyl)-3-phenyl-pyrazol-5-one | $Ca^{2+}$ | Yellow |
| 83 | 1-amino-2-chloro-benzene-5-sulphonic acid | 1-(4'-chloro-3'-sulphophenyl)-3-phenyl-pyrazol-5-one | $Ca^{2+}$ | Reddish yellow |
| 84 | 1-amino-2-chloro-benzene-5-sulphonic acid | 1-(3'-sulphophenyl)-3-(4'-chlorophenyl)-pyrazol-5-one | $Ca^{2+}$ | Reddish yellow |
| 85 | 1-amino-2-chloro-benzene-5-sulphonic acid | 1-(4'-chloro-3'-sulphophenyl)-3-(4'-chlorophenyl)-pyrazol-5-one | $Ca^{2+}$ | Reddish yellow |
| 86 | 1-amino-2-chloro-benzene-5-sulphonic acid | 1-(2',5'-dichloro-4'-sulphophenyl)-3-(4'-chlorophenyl)-pyrazol-5-one | $Ca^{2+}$ | Reddish yellow |
| 87 | 1-amino-2-chloro-benzene-5-sulphonic acid | 1-(3'-sulphophenyl)-3-(4'-methoxyphenyl)-pyrazol-5-one | $Ca^{2+}$ | Brownish yellow |
| 88 | 1-amino-2-chloro-benzene-5-sulphonic acid | 1-(2',5'-dichloro-4'-sulphophenyl-3-(4'-methoxyphenyl)-pyrazol-5-one | $Ca^{2+}$ | Brownish yellow |
| 89 | 1-amino-2-chloro-benzene-5-sulphonic acid | 1-(3'-sulphophenyl)-3-(4'-nitrophenyl)-pyrazol-5-one | $Ca^{2+}$ | Orange |
| 90 | 2-methoxyaniline-5-sulphonic acid | 1-(3'-sulphophenyl)-3-methyl-5-iminopyrazolone | $Ca^{2+}$ | Yellow |
| 91 | 2-methoxyaniline-5- | 1-(4'-chloro-3'-sulphophenyl)- | $Ca^{2+}$ | Yellow |

-continued

| Example | Diazo component | Coupling component | Me | Shade |
|---|---|---|---|---|
| | sulphonic acid | 3-methyl-5-iminopyrazolone | | |
| 92 | 2-methoxyaniline-5-sulphonic acid | 1-(2'-chloro-5'-sulphophenyl)-3-methyl-5-iminopyrazolone | $Ca^{2+}$ | Yellow |
| 93 | 2-methoxyaniline-5-sulphonic acid | 1-(2',5'-dichloro-4'-sulphophenyl)-3-methyl-5-iminopyrazolone | $Ca^{2+}$ | Yellow |
| 94 | 2-methoxyaniline-5-sulphonic acid | 1-(3'-sulphophenyl)-3-phenyl-5-iminopyrazol-5-one | $Ca^{2+}$ | Reddish yellow |
| 95 | 2-methoxyaniline-5-sulphonic acid | 1-(2'-sulphophenyl)-3-phenyl-pyrazol-5-one | $Ca^{2+}$ | Reddish yellow |
| 96 | 2-methoxyaniline-5-sulphonic acid | 1-(3'-sulphophenyl)-3-phenyl-pyrazol-5-one | $Ca^{2+}$ | Reddish yellow |
| 97 | 2-methoxyaniline-5-sulphonic acid | 1-(2'-chloro-5'-sulphophenyl)-3-phenyl-pyrazol-5-one | $Ca^{2+}$ | Yellow |
| 98 | 2-methoxyaniline-5-sulphonic acid | 1-(4'-chloro-3'-sulphophenyl)-3-phenyl-pyrazol-5-one | $Ca^{2+}$ | Strongly reddish yellow |
| 99 | 2-methoxyaniline-5-sulphonic acid | 1-(3'-sulphophenyl)-3-(4'-chloro-phenyl)-pyrazol-5-one | $Ca^{2+}$ | Reddish yellow |
| 100 | 2-methoxyaniline-5-sulphonic acid | 1-(4'-chloro-3'-sulphophenyl)-3-(4'-chlorophenyl)-pyrazol-5-one | $Ca^{2+}$ | Reddish yellow |
| 101 | 2-methoxyaniline-5-sulphonic acid | 1-(2',5'-dichloro-3'-sulphophenyl)-3-(4'-chlorophenyl)-pyrazol-5-one | $Ca^{2+}$ | Reddish yellow |
| 102 | 2-methoxyaniline-5-sulphonic acid | 1-(3'-sulphophenyl)-3-(4'-methoxy-phenyl)-pyrazol-5-one | $Ca^{2+}$ | Red-brownish yellow |
| 103 | 2-methoxyaniline-5-sulphonic acid | 1-(2',5'-dichloro-4'-sulpho-phenyl)-3-(4'-methoxyphenyl)-pyrazol-5-one | $Ca^{2+}$ | Brownish yellow |
| 104 | 2-methoxyaniline-5-sulphonic acid | 1-(3'-sulphophenyl)-3-(4'-nitro-phenyl)-pyrazol-5-one | $Ca^{2+}$ | Orange |
| 105 | 4-methoxyaniline-2-sulphonic acid | 1-(3'-sulphophenyl)-3-methyl-5-iminopyrazolone | $Ca^{2+}$ | Reddish yellow |
| 106 | 4-methoxyaniline-2-sulphonic acid | 1-(4'-chloro-3'-sulphophenyl)-3-methyl-5-iminopyrazolone | $Ca^{2+}$ | Reddish yellow |
| 107 | 4-methoxyaniline-2-sulphonic acid | 1-(3'-sulphophenyl)-3-phenyl-5-iminopyrazolone | $Ca^{2+}$ | Reddish yellow |
| 108 | 4-methoxyaniline-2-sulphonic acid | 1-(2'-sulphophenyl)-3-phenyl-phenyl-pyrazol-5-one | $Ca^{2+}$ | Orange |
| 109 | 4-methoxyaniline-2-sulphonic acid | 1-(4'-chloro-3'-sulphophenyl)-3-pyrazol-5-one | $Ca^{2+}$ | Reddish orange |
| 110 | 4-methoxyaniline-2-sulphonic acid | 1-(3'-sulphophenyl)-3-phenyl-pyrazol-5-one | $Ca^{2+}$ | Orange |
| 111 | 4-methoxyaniline-2-sulphonic acid | 1-(2',5'-dichloro-3'-sulphophenyl)-3-(4'-chlorophenyl)-pyrazol-5-one | $Ca^{2+}$ | Yellowish orange |
| 112 | 1-amino-3-chloro-4-methylbenzene-6-sulphonic acid | 1-(3'-sulphophenyl)-3-methyl-5-iminopyrazolone | $Ca^{2+}$ | Yellow |
| 113 | 1-amino-3-chloro-4-methylbenzene-6-sulphonic acid | 1-(4'-chloro-3'-sulphophenyl)-3-phenyl-5-iminopyrazolone | $Ca^{2+}$ | Yellow |
| 114 | 1-amino-3-chloro-4-methylbenzene-6-sulphonic acid | 1-(2'-sulphophenyl)-3-phenyl-pyrazol-5-one | $Ca^{2+}$ | Reddish yellow |
| 115 | 1-amino-3-chloro-4-methylbenzene-6-sulphonic acid | 1-(2'-chloro-5'-sulphophenyl)-3-(4'-chlorophenyl)-pyrazol-5-one | $Ca^{2+}$ | Reddish yellow |
| 116 | 1-amino-4-N-acetyl-amino-5-methoxybenzene-2-sulphonic acid | 1-(3'-sulphophenyl)-3-methyl-5-iminopyrazolone | $Ca^{2+}$ | Yellow |
| 117 | 1-amino-4-N-acetyl-amino-5-methoxybenzene-2-sulphonic acid | 1-(2'-sulphophenyl)-3-phenyl-pyrazol-5-one | $Ca^{2+}$ | Reddish yellow |
| 118 | 6-methoxy-4-nitro-aniline-3-sulphonic acid | 1-(3'-sulphophenyl)-3-methyl-5-iminopyrazolone | $Ca^{2+}$ | Reddish yellow |
| 119 | 6-methoxy-4-nitro-aniline-3-sulphonic acid | 1-(2'-sulphophenyl)-3-phenyl-pyrazol-5-one | $Ca^{2+}$ | Orange |
| 120 | 2-nitroaniline-4-sulphonic acid | 1-(3'-sulphophenyl)-3-methyl-5-iminopyrazolone | $Ca^{2+}$ | Yellow |
| 121 | 2-nitroaniline-4-sulphonic acid | 1-(2'-sulphophenyl)-3-phenyl-pyrazol-5-one | $Ca^{2+}$ | Reddish yellow |

EXAMPLES 121–154

Furthermore, 1-amino-3-chloro-4-methylbenzene-6sulphonic acid was coupled onto the coupling components mentioned in Examples 5–15, 17–20, 22–39 by the methods indicated in Examples 1–4. Greenish yellow to reddish orange products are obtained.

EXAMPLES 155–161

4-ethoxyaniline-2-sulphonic acid was reacted with the coupling components mentioned in Examples 105–111 analogously to the methods in Examples 1–4. Reddish yellow to reddish orange pigments are obtained.

EXAMPLE 162

Transparent colouring of PVC-P:

0.1 part of yellow pigment prepared as described in Example 1 is mixed with 100 parts of PVC compound in a slow-speed laboratory mixing device, the mixture is discharged onto the running laboratory mixing rolls and homogenized, and drawn off as a sheet.

Yellow transparent colourings of excellent light stability are obtained.

EXAMPLE 163

Nontransparent colouring of PVC-P:

0.2 part of yellow pigment prepared as described in Example 42 are mixed together with 10 parts of titanium dioxide (futile type) with 100 parts of PVC compound and homogenized at 160° C. The sheet drawn off the laboratory mixing rolls has a nontransparent, yellow shade. The colourings have a very good migration and light fastness.

EXAMPLE 164

Translucent and nontransparent colourings of HD polyethylene and polypropylene:

100 parts of commercially available polyethylene granulate are mixed with 0.2 part of yellow pigment from Example 24 in a slow-speed mixing drum. The granulate obtained is homogenized at 170° C. via an extruder and drawn off to flat ribbons, which are granulated once more and injection-moulded on a screw injection moulding machine at a temperature above 200° C. On increasing the injection moulding temperature from 200° C. to 320° C. there is no observable change in colour.

Identical results are obtained with nontransparent colourings of titanium dioxide (rutile type) in HD-PE and in crystalline polypropylene, likewise as transparent and nontransparent pigmentations.

EXAMPLE 165

Colouring of polystyrene (PS) and butadiene-modified polystyrene (SB):

0.1 part of yellow pigment prepared as described in Example 65 is mixed with 0.5 part of titanium dioxide (rutile type) and 100 parts of PS granulate (SB granulate), and the mixture is injection-moulded on a screw injection moulding machine at elevated back pressure. Mouldings having a strongly reddish yellow, brilliant shade and uniform pigment distribution are obtained.

EXAMPLE 166

Colouring of ABS:

0.5 part of yellow pigment from Example 21 is mixed with 4 parts of titanium dioxide (rutile type) and 100 parts of ABS powder, the mixture is plasticized at 180° C. in an internal mixer, is discharged after homogenization via mixing rolls, and is granulated by the customary methods, and the granulate is injection-moulded on a screw injection moulding machine into mouldings having a luminous yellow colour. At processing temperatures of 220° C. to 280° C. and long residence times there are no observable changes in colour.

Similarly good results are obtained in plastics blends of the composition ABS/polycarbonate.

EXAMPLE 167

Colouring of polycarbonate (PC) and polycarbonate/polybutylene terephthalate (PC/PBT):

0.2 part of yellow pigment prepared as described in Example 2 is mixed dry with commercially available polycarbonate, the mixture is melted at 290° C. on a twin shaft extruder and in the course of melting the pigment is dispersed. The homogeneously coloured PC is granulated once more, and the granulate is processed by customary injection moulding methods at temperatures up to 340° C. There are no observable hue changes of the greenish yellow mouldings at different temperatures.

Even in PC/PBT the pigment is heat-resistant without change in shade at processing temperatures of 250° C. to 290° C., Also noteworthy is the excellent motor fuel resistance.

We claim:

1. An azo lake of the formula

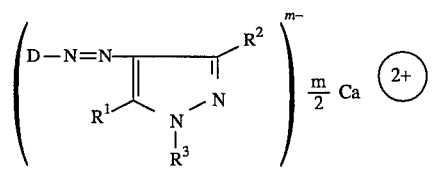

in which

D represents

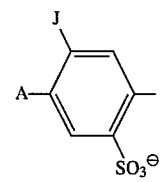

in which A is Cl or $CH_3$ and J is H, Cl or $CH_3$, $R^1$ represents $NH_2$, $R^2$ represents $C_1$–$C_4$-alkyl, and $R^3$ represents

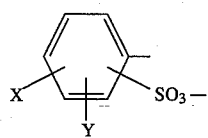

in which X is H or Cl and Y is H or Cl, and m=1+o+p with the condition 1≦m≦3, and o and p are 0, 1, or 2.

2. An azo lake according to claim 1, wherein A and J are Cl.

3. An azo lake according to claim 1, wherein A is Cl.

4. An azo lake according to claim 1, wherein J is Cl.

5. An azo lake according to claim 1, wherein either A or J is $CH_3$.

6. An azo lake according to claim 1, of the formula

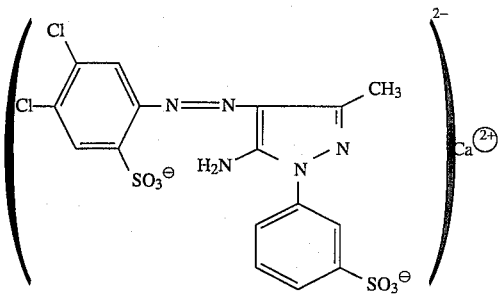

7. An azo lake according to claim 1, wherein m is 2.

* * * * *